United States Patent [19]

Dearman

[11] Patent Number: 4,492,015
[45] Date of Patent: Jan. 8, 1985

[54] APPARATUS FOR USE IN WELDING

[76] Inventor: Timothy C. Dearman, P.O. Box 937, Pearland, Tex. 77581

[21] Appl. No.: 391,980

[22] Filed: Jun. 24, 1982

[51] Int. Cl.³ .............................................. B23K 37/04
[52] U.S. Cl. ...................................... 29/281.5; 269/43
[58] Field of Search ................ 29/525, 234, 244, 252, 29/272, 283.5, 281.5, 281.4, 428; 228/44.5, 49 B; 269/43, 287

[56] References Cited

U.S. PATENT DOCUMENTS

| | | | |
|---|---|---|---|
| 1,894,835 | 1/1933 | Smith et al. | 29/234 |
| 2,800,867 | 7/1957 | Smith | 269/287 |
| 2,929,053 | 10/1960 | Forbes | 29/234 |
| 3,239,209 | 3/1966 | Kucka | 228/49 B |
| 3,522,647 | 8/1970 | Holcomb et al. | 228/184 |
| 3,593,402 | 7/1971 | Mori | 228/44.5 |
| 3,618,845 | 11/1971 | Totten | 228/49 B |
| 3,658,231 | 4/1972 | Gilman | 29/281.5 |
| 3,705,453 | 12/1972 | Olson | 228/44.5 |
| 3,711,920 | 1/1973 | Simmons | 29/281.5 |
| 3,734,387 | 5/1973 | Sannipoli | 228/184 |
| 3,828,413 | 8/1974 | Province et al. | 29/281.4 |
| 3,920,232 | 11/1975 | Clark | 29/281.5 |
| 3,952,936 | 4/1976 | Dearman | 228/49 B |
| 4,039,115 | 8/1977 | Randolph et al. | 269/287 |
| 4,176,269 | 11/1979 | Merrick et al. | 228/44.5 |
| 4,356,615 | 11/1982 | Dearman | 29/525 |

Primary Examiner—Robert C. Watson
Attorney, Agent, or Firm—Learman & McCulloch

[57] ABSTRACT

Apparatus for use in welding end-to-end a pair of annular members such as pipes has first and second annular clamps for encircling and clamping the respective pipes. One of the clamps is supported by the other for axial, transverse, and rocking movements relative to the other clamp while the two pipes are clamped so as to enable the confronting ends of the two pipes to be located in a predetermined relationship prior to being welded together and then maintained in such relationship during welding. Clamping forces are applied on the pipes by radially adjustable pressure members spaced circumferentially about the clamps. The clamps are swingable conjointly from a vertical, operative position to a horizontal position in which the assembly and adjustment of the pressure members is facilitated.

32 Claims, 11 Drawing Figures

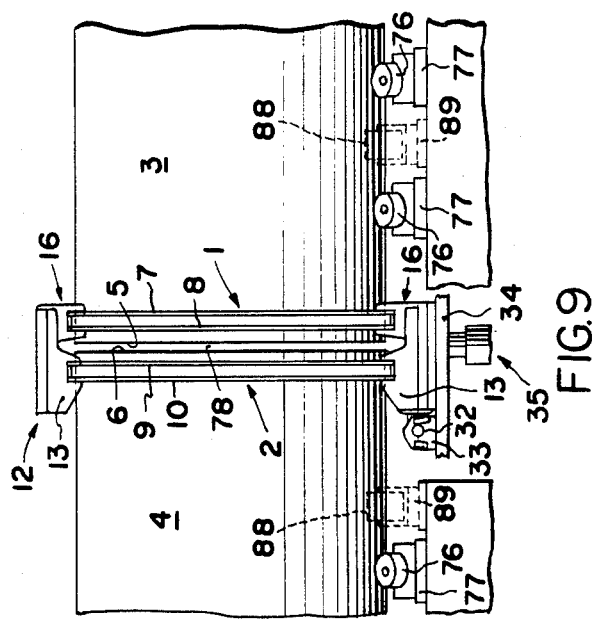
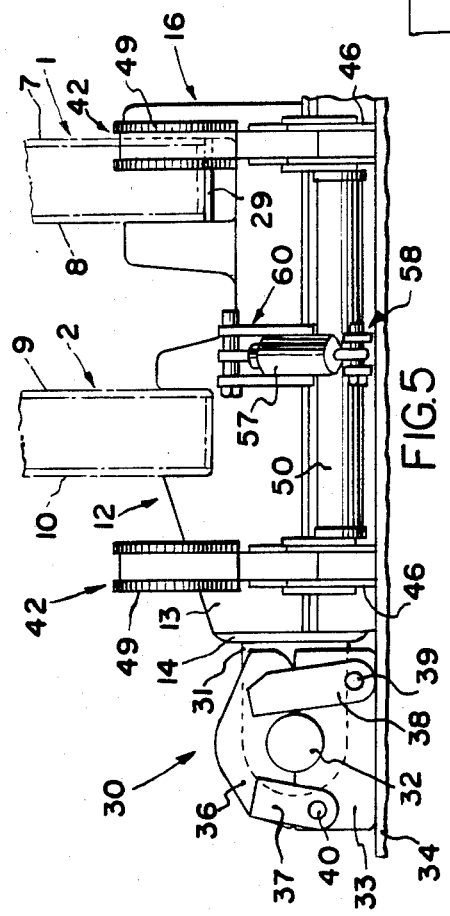
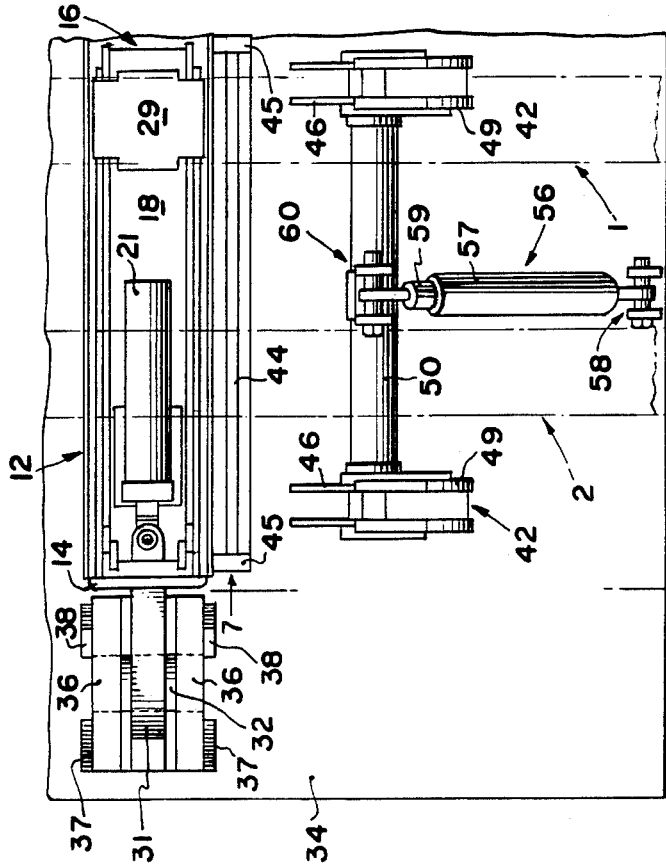

APPARATUS FOR USE IN WELDING

BACKGROUND OF THE INVENTION

This invention relates to apparatus for use in welding together two annular members such as large diameter pipe sections used in the manufacture of fluid vessels, railroad tank cars, and the like, and more particularly to apparatus for use in fitting, prior to welding, two such pipe sections in end-to-end or telescoping relation. The apparatus disclosed herein is similar in many respects to that disclosed in co-pending application Ser. No. 141,051, filed Apr. 17, 1980 now U.S. Pat. No. 4,356,615.

Fluid vessels, tank cars, and the like conventionally are formed by welding together pipe sections having diameters of as much as thirteen feet. When such large diameter pipe sections are to be welded to one another it is extremely difficult to position and maintain them in proper positions end-to-end so that they properly may be welded to one another. The difficulty is enhanced in most instances because rarely, if ever, do the adjacent ends of the two sections conform exactly, either as to configuration or wall thickness. It is necessary, therefore, to reform the confronting ends of the pipe sections so that their configurations match each other as closely as possible and so that any mis-match between the wall thicknesses is compensated for as much as possible. These operations require not only physical reshaping of one or both of the pipe sections, but relative movement of their confronting ends while maintaining clamping forces on the pipe sections.

Apparatus constructed and operated in accordance with the invention minimizes greatly the difficulties heretofore encountered in fitting together and welding members of the kind referred to, greatly accelerates pre-welding fit-up operations, minimizes the time to effect a weld, and minimizes the possibility of inferior welds being obtained.

Preparatory to welding together two pipes according to the invention one pipe is secured in fixed position on a support and encircled by a clamp adjacent that end which is to be welded. The clamp is provided with pressure exerting members which apply compressive forces on the pipe so as to reform and reshape its end to a cylindrical or substantially cylindrical configuration. The second pipe is brought to a position adjacent the end of the first pipe with the adjacent ends of the two pipes confronting one another. A second clamp encircles the second pipe adjacent that end of the latter which is to be welded and exerts a radial force on the second pipe to reform its end to a configuration compatible with the end of the first pipe. The second clamp is carried by the first clamp and is movable relatively to the latter while maintaining the clamping force on its pipe. Adjustment of the second clamp relative to the first clamp thus enables corresponding relative adjustment of the two pipes so as to locate their confronting ends in the most favorable positions for welding.

If the two pipes are to be welded end-to-end, the confronting ends of the pipes are reformed so as to correspond closely to one another. If the second pipe is to be telescoped within the first pipe, the second pipe initially must have a nominal outside diameter corresponding substantially to the inside diameter of the first pipe. In this instance, the clamps encircling the pipes apply radially compressive forces to the respective pipes to conform their shapes and enable the second pipe to telescope into the first pipe.

Reformation of the ends of adjacent pipes usually requires that the pipes be shifted transversely, or rocked, or both, to arrange the confronting ends properly for welding. Further, following proper arrangement of the confronting ends, the pipes frequently require movement toward one another, especially when one pipe is to be telescoped into the other. Apparatus constructed in accordance with the invention enables all of these requirements to be met.

Reformation of the confronting ends of the two pipes is accomplished by the application of radially compressive force on such pipes. Such force preferably is substantially uniform about the periphery of the pipes and is applied by radially extending, adjustable force applying members. Preferably, the radial adjustment is effected by power means, and to facilitate assembly and initial adjustment of such force applying means the clamps on which such force applying members are mounted are supported for swinging movements between raised and lowered positions.

SUMMARY OF THE INVENTION

The disclosed embodiment of the invention is designed for the purpose of facilitating the fitting together and welding end-to-end of two members, such as two large diameter pipe sections. The apparatus includes a first annular clamp that is adapted to encircle and clamp one of the pipes adjacent that end of the latter to which the second pipe is to be welded. The first clamp carries a plurality of circumferentially spaced radially extending pressure members which engage the associated pipe and exert radially directed clamping forces thereon. The apparatus also includes a second annular clamp carried by the first clamp and adapted to encircle the second pipe that is to be welded to the first pipe, the two clamps being parallel, coaxial, and spaced apart a distance sufficient to enable a joint between the confronting ends of the two pipes to lie between the two pipes in an exposed position accessible to a welder. The second clamp has pressure members like the first clamp and is a floating clamp in the sense that it is capable of adjustment relative to the other or fixed clamp so as to enable the second pipe to be shifted substantially universally relatively to the first pipe for purposes of positioning the two pipes properly. The adjustment of the floating clamp and its associated pipe is effected by adjusting means carried by the fixed clamp. Following alignment of the two pipes, the floating clamp may be adjusted in a direction to move the confronting ends of the pipes toward one another to a welding position in which the two pipes may be welded. The two pipes may be butt welded or, if desired, one may be telescoped within the other. Following the welding operation, the clamps are released and the welded pipes removed or relocated for subsequent use of the apparatus in another welding operation.

In the disclosed embodiment of the invention the clamps are in an upright position when in use. It is desirable, however, that the clamps conjointly may be rocked about a horizontal axis to occupy a substantially horizontal position, thereby facilitating greatly the assembly and adjustment of the pressure member which apply clamping forces on the associated pipes. Preferably, groups of the pressure members simultaneously are adjustable radially of their respective clamps by power means, thereby greatly minimizing the time required to adjust such pressure members.

DESCRIPTION OF THE DRAWINGS

The construction and operation of the invention, and the advantages thereof, are explained in the following description and are disclosed in the accompanying drawings, wherein:

FIG. 5 is an enlarged elevational view of a latching mechanism associated with the apparatus shown in FIG. 1;

FIG. 6 is a plan view of the mechanism shown in FIG. 5;

FIG. 9 is a view simialr to FIG. 1 but illustrating additional pipe supporting apparatus;

DETAILED DESCRIPTION

Figure 1:
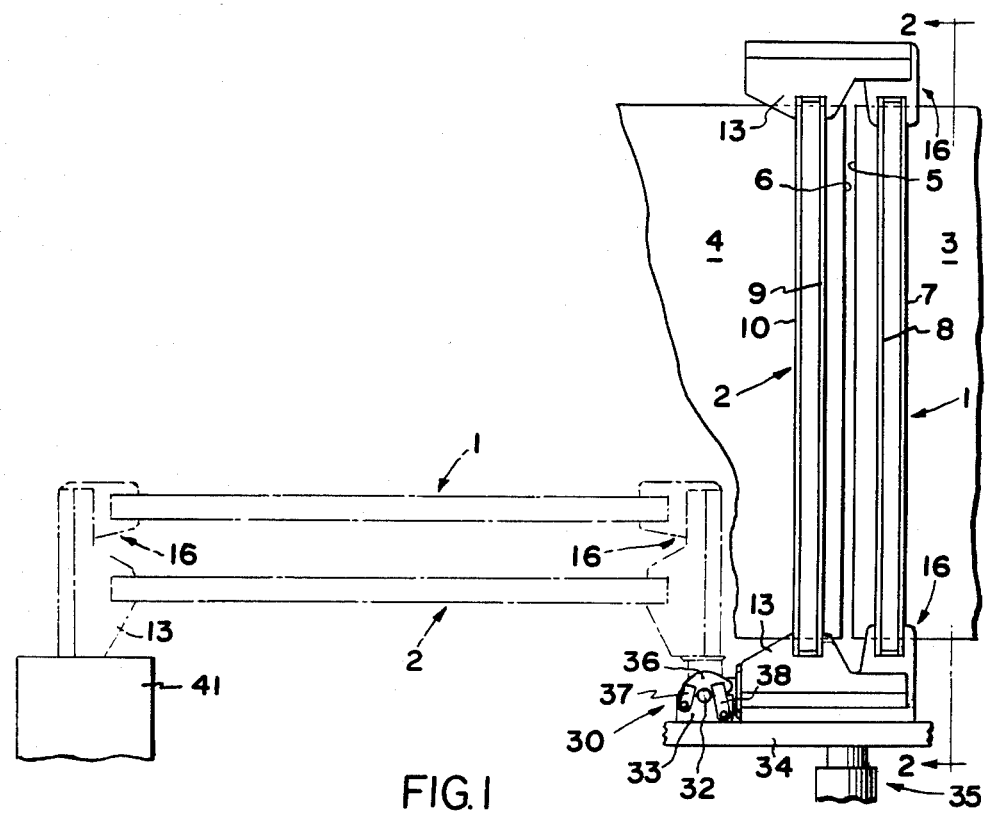
FIG. 1 is a fragmentary, diagrammatic elevational view illustrating the apparatus clamping two pipe lengths in position to be welded to one another.

The disclosed embodiment of the invention comprises a pair of annular clamp members 1 and 2 of such diameter as to encircle a pair of pipe members 3 and 4 arranged in prolongation of one another and having confronting ends 5 and 6, respectively. Each clamp may be composed of arcuate segments coupled to one another, as is disclosed in the aforementioned application Ser. No. 141,051 now U.S. Pat. No. 4,356,615 or each clamp may be unbroken.

In any case the clamp 1 is composed of parallel, spaced apart rings 7 and 8, and the clamp 2 is composed of similar rings 9 and 10. The rings of each clamp are spaced from and joined to each other by spacers 11 (FIG. 8) which will be referred to subsequently in more detail.

The clamp 1 is a floating clamp and is supported by and coupled to the clamp 2 for movements relative thereto. The supporting means for the clamp 2 comprises a plurality of U-shaped shoes 12 each of which has a pair of parallel plates 13 joined by a web 14. The plates are notched as at 15 for the accommodation of the rings 9 and 10, and the latter are welded or otherwise fixed to the shoe.

Slideably accommodated between the plates 13 of each shoe 12 is an adjustable support 16 comprising parallel plates 17 joined by a web 18. Each plate 17 is notched as at 19, and slideably accommodated in such notches is the clamp 1.

Figure 3:
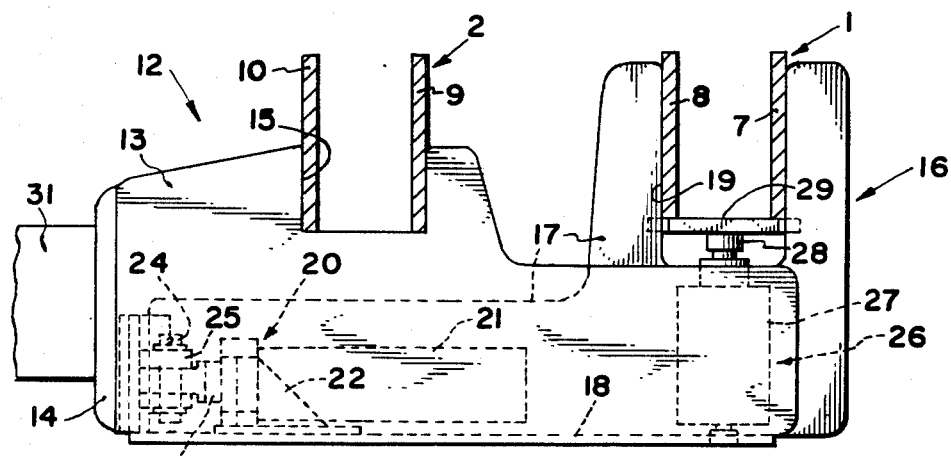
FIG. 3 is a fragmentary, enlarged, partly elevational and partly sectional view of a portion of the apparatus shown in FIG. 1.
Figure 4:
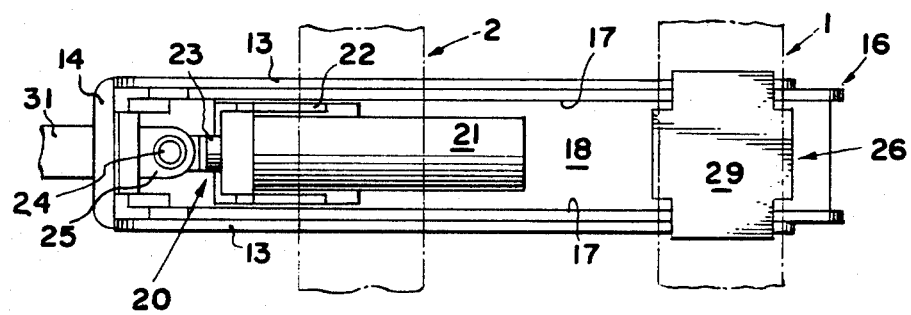
FIG. 4 is a fragmentary top plan view of the apparatus shown in FIG. 3.

Adjusting means reacts between each shoe 12 and the associated support 16 for effecting sliding movements therebetween and comprises a hydraulic ram 20 (FIGS. 3 and 4) having a cylinder 21 fixed to a bracket 22 carried by the web 18 of the support 16 and a piston rod 23 pivoted as at 24 to a bracket 25 fixed to the web 14 of the shoe 12. Extension and retraction of all rams 20 simultaneously effects adjustment of the clamps 1 and 2 away from and toward one another, while maintaining the clamps parallel, whereas extension or retraction of the rams independently of one another effects limited rocking movement of the clamps relative to one another. That is, the floating clamp 1 may be rocked in such manner as to enable the two clamps to rock between parallel and nonparallel positions.

Transverse adjusting means 26 (FIGS. 3 and 4) reacts between at least the two lower supports 16 and the floating clamp 1 to effect bodily radial shifting of the latter relative to the clamp 2. Each adjusting means 26 comprises a hydraulic ram 27 having a cylinder fixed to the web 18 and a piston rod 28 fixed to a plate 29 that bears against the ring members 7 and 8 of the clamp 1. Extension and retraction of any one ram 27 will effect bodily movement of the clamp 1 radially of the clamp 2. If a ram 27 is associated with each support 16, the opposing rams 27 may have to be operated in such manner as to extend one ram and retract the other to effect radial shifting of the clamp 1 without imposing binding forces thereon.

The mounting of the floating clamp 1 in such manner as to enable it to move toward and away from the clamp 2, to rock relatively to the clamp 2, and to shift transversely or radially of the clamp 2 results in the floating clamp's being substantially universally adjustable relative to the clamp 2.

The clamp 2 may be mounted in any one of a number of different ways so that both clamps lie in a vertical plane during use. Thus, the clamp mounting means shown in application Ser. No. 141,051 may be used. It is preferred, however, that the clamp 2 be mounted for swinging movements between vertical and horizontal positions. Apparatus constructed according to the disclosed embodiment, therefore, includes pivotal mounting means 30 for such purpose.

The pivotal mounting means 30 is best shown in FIGS. 1, 5, and 6 and comprises an extension 31 carried by each of the two lower shoes 12 and projecting from the web 14. Each extension terminates in a trunnion 32 that is accommodated in a fitting 33 carried by a horizontal support 34 that is vertically adjustable by means of one or more hydraulic rams 35. Keepers 36 overlie each trunnion 32 and are pivoted and latched to the associated fitting by links 37, a latch bar 38, and a removable latch pin 39.

Removal of the latch pin 39 enables the keepers 36 to be swung about a pivot 40 counterclockwise from the position shown in FIG. 5, thereby enabling the trunnion 32 to be removed from the fitting 33. When the parts of the pivotal mounting means are in the positions shown in FIG. 5, however, the clamps 1 and 2 are swingable conjointly about the axes of the trunnions 32 between the vertical and horizontal positions shown in FIG. 1. When occupying the horizontal position, the clamps are supported partly by the members 34 and partly by a block 41. Swinging movements of the clamps 1 and 2 are effected by a crane (not shown) or any other suitable apparatus.

Figure 7:
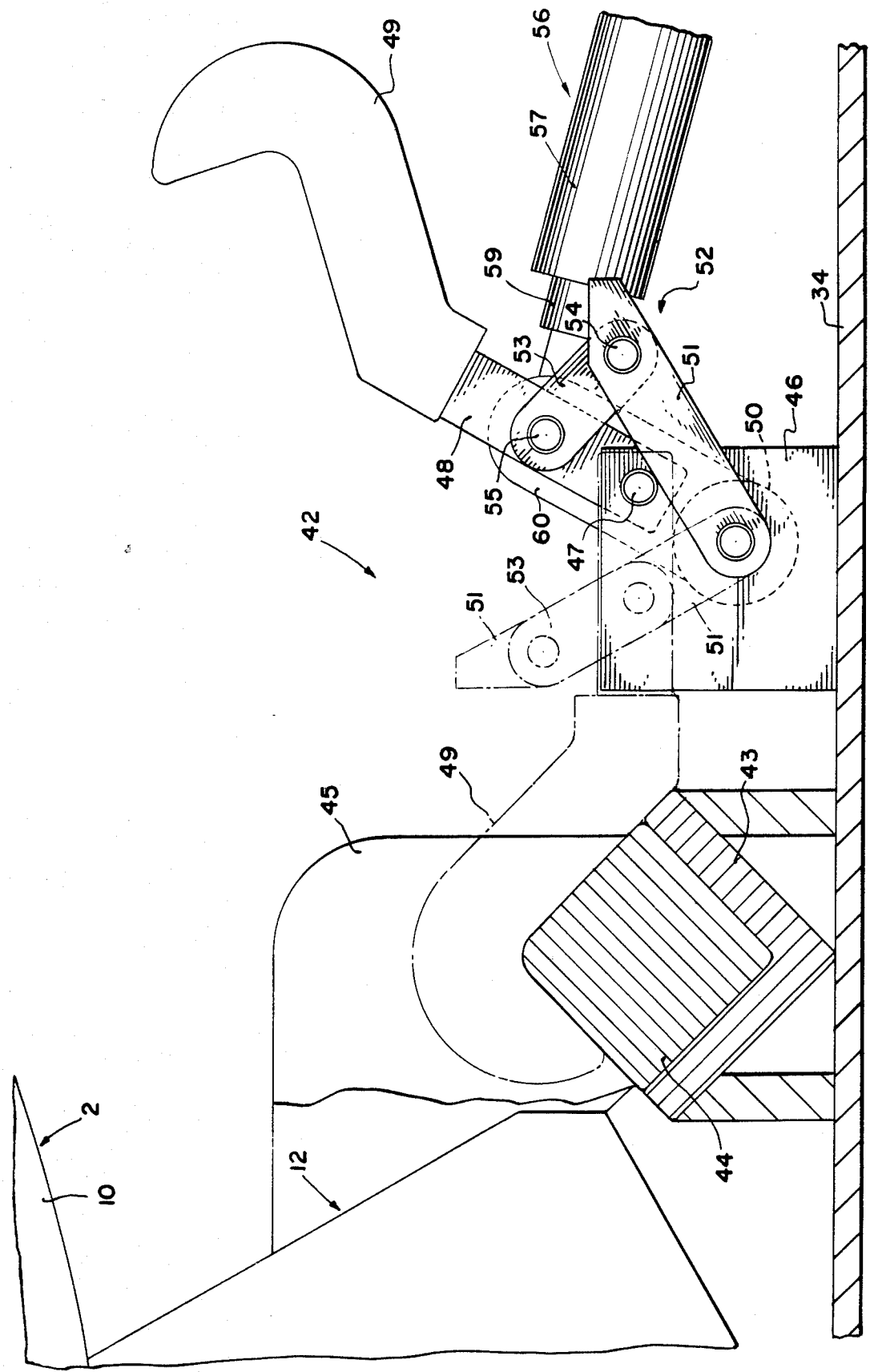
FIG. 7 is a greatly enlarged sectional view taken on the line 7—7 of FIG. 6.

A pair of releasable latching devices 42 (FIGS. 5-7) is provided for latching the clamps 1 and 2 in the vertical position. Each latching device comprises a V-shaped socket 43 fixed to and upstanding from the associated support 34 and which is adapted removably to accommodate an anchor bar 44 fixed to arms 45 which project laterally from the adjacent shoe 12. Adjacent opposite ends of each socket 43 are mounting brackets 46 to each of which is pivoted as at 47 one end of an arm 48, at the opposite end of which is a clamp hook or finger 49. Journaled in and spanning each pair of mounting brackets 46 is a shaft 50 to which is fixed one link 51 of a toggle linkage 52 having a second link 53 pivoted at one end as at 54 to the link 51 and at the other end to the adjacent arm 48 as at 55.

Operating means for each latching device 42 comprises a ram 56 having its cylinder 57 secured to the support 34 by a coupling 58 and its piston rod 59 fixed to the shaft 50 by a coupling 60. In the retracted condition of each operating ram 56 the associated clamp fingers 49 are withdrawn from engagement with the associated anchor bar 44, as is shown in full lines in FIG. 7, whereas in the extended condition of the ram the clamp fingers 49 overlie and engage the anchor bars as shown in chain lines in FIG. 7. In the latter position the links of the toggle links 52 are parallel to one another and prevent inadvertent clockwise rotation of the clamp fingers from the chain line position shown in FIG. 1. Thus, release of each latching device depends upon contraction of the associated operating ram 56.

Figure 2:
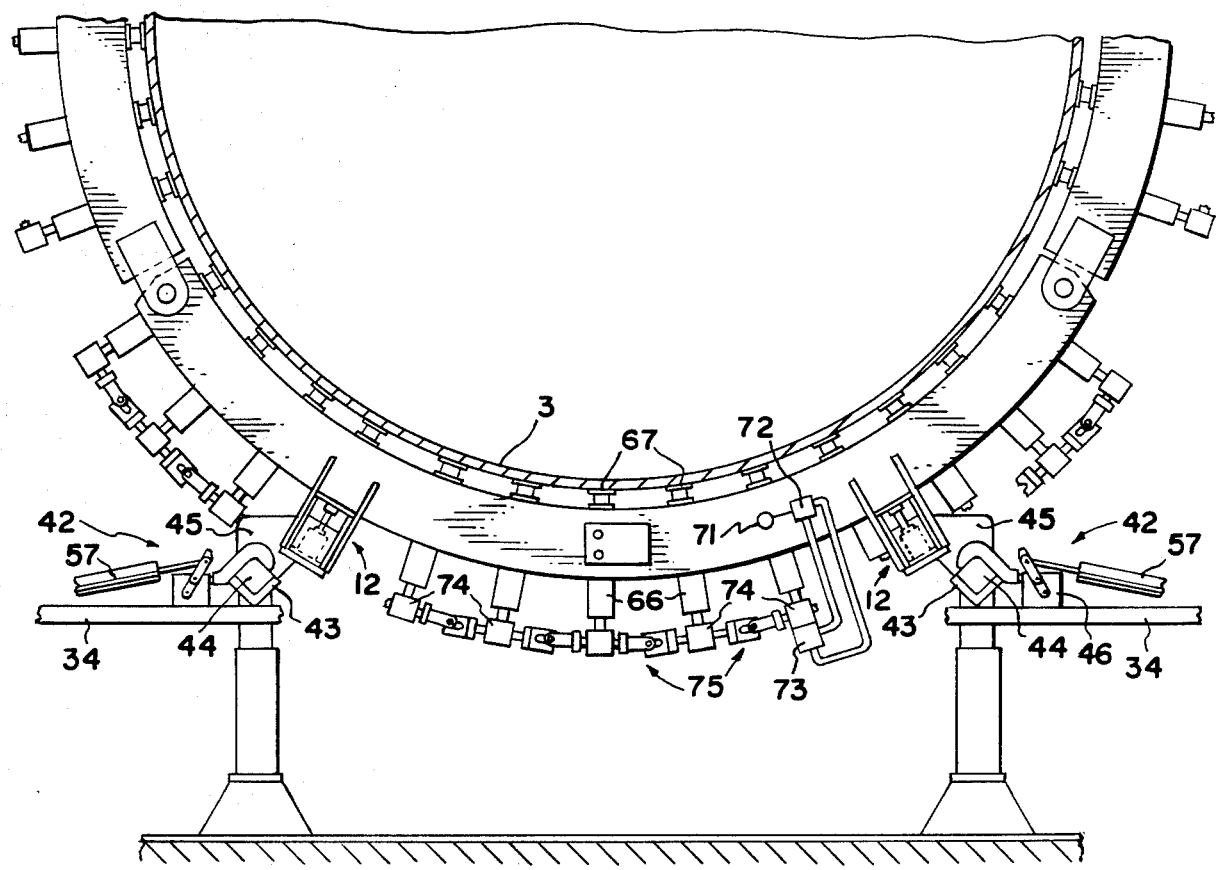
FIG. 2 is a sectional view taken on the line 2—2 of FIG. 1.
Figure 8:
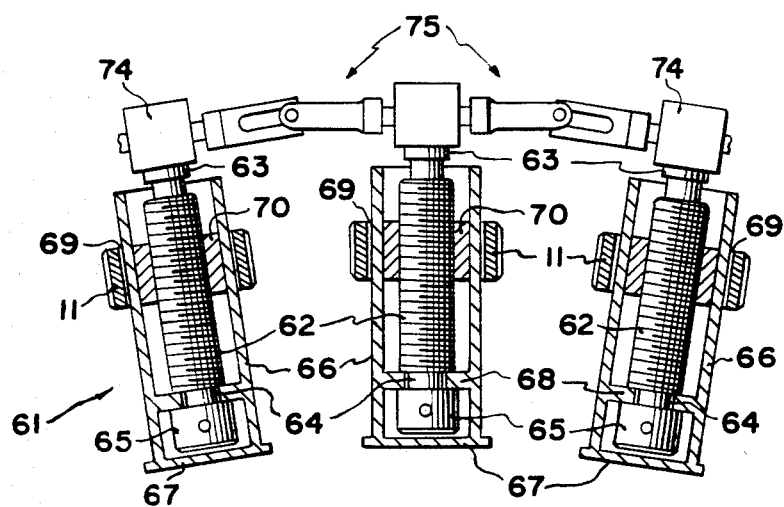
FIG. 8 is a fragmentary, sectional, enlarged view of pressure applying members adapted for use with the disclosed apparatus.

Each clamp 1 and 2 is provided with a plurality of adjustable pressure members 61, best shown in FIGS. 2 and 8. Each pressure member comprises a threaded screw 62 terminating at one end in a head 63 and at its opposite end a smooth neck 64 to which is removably pinned an enlargement 65. Each screw 62 is accommodated in a hollow housing 66 terminating at one end in a foot 67. Spaced from the foot 67 is a partition 68 through which the neck 64 of the screw 62 rotatably passes. The housings 66 are slideably accommodated in openings 69 formed in the spacers 11 that join the confronting annular members 7, 8 and 9, 10 of the associated clamps 1 and 2 to each other. The spacers 11, therefore, not only join together the individual rings of the associated clamps, but also provide guides for the pressure members 61.

Each screw 62 extends through a correspondingly threaded opening formed in a nut 70 that is fixed within the housing 66 of the associated pressure member 61. The arrangement is such that rotation of the screw 62 in one direction or the other effects adjustment of the associated pressure member 61 radially of its clamp 1 or 2. The adjustability of each pressure member 61 preferably is such that pipes of considerably differing diameter may be accommodated within the clamps 1 and 2 and be fixed therein by engagement with the pressure members 61. Thus, if each pressure member is capable of radial movement a distance of one foot, for example, pipes having diameter differences of as much as two feet can be accommodated by a single set of clamps.

Each of the pressure members 61 may be adjusted radially independently of the others by rotation of its associated screw 62. It is preferred, however, that groups of pressure members be capable of adjustment simultaneously. For this purpose a number of reversible, electrically driven hydraulic pumps 71 (FIG. 2) are mounted on each of the clamps 1 and 2 and each pump is adapted to circulate fluid between a reservoir 72 and a reversible hydraulic motor 73 having its output connected to a gear box 74 within which is a driving gear coupled to the head 63 of a screw 62. All of the gear boxes 74 of a group of pressure members 61 are coupled by a train of universal joints 75 so that all pressure members of a group may be extended or retracted radially at the same time and to the same extent.

Initial assembly and individual adjustment of the pressure members 61 is facilitated, and is safer for a workman, if the clamps 1 and 2 may be lowered to the horizontal position shown in chain lines in FIG. 1, and it is for these purposes that the clamps are mounted for swinging movements between vertical and horizontal positions. It will be understood that the clamps 1 normally occupy a fixed position in a vertical plane and that the pipes 3 and 4 are moved toward the clamps from opposite ends thereof. Although any suitable means for supporting the pipes during such movement may be utilized it is convenient to use rollers 76 (FIG. 9) forming a cradle and mounted on rams 77 which may extend and retract the rollers into and out of engagement with the respective pipes.

To prepare the two pipes 3 and 4 to be welded together end-to-end, the clamps 1 and 2 are positioned in their vertical positions, as shown in FIG. 9, and expanded, or the pressure members 61 radially extended, to enable the pipe 3 to be rolled toward and into the clamp 1 along the rollers 76, and the pipe 4 to be rolled toward and into the clamp 2 along the rollers 76 leading to the clamp 2. The pipes 3 and 4 are supported on the respective rollers and so positioned that the confronting ends 5 and 6 lie approximately midway between the clamps 1 and 2. The clamps then may be closed, or the pressure members 61 adjusted so that the feet 67 forcibly bear against the pipes 3 and 4 and exert such force thereon as to reshape or reform the configurations of the free ends 5 and 6. The confronting ends of the two pipes will be acted upon by the pressure members so that the configuration of the pipe end 5 conforms to that of the pipe end 6.

Figure 10:
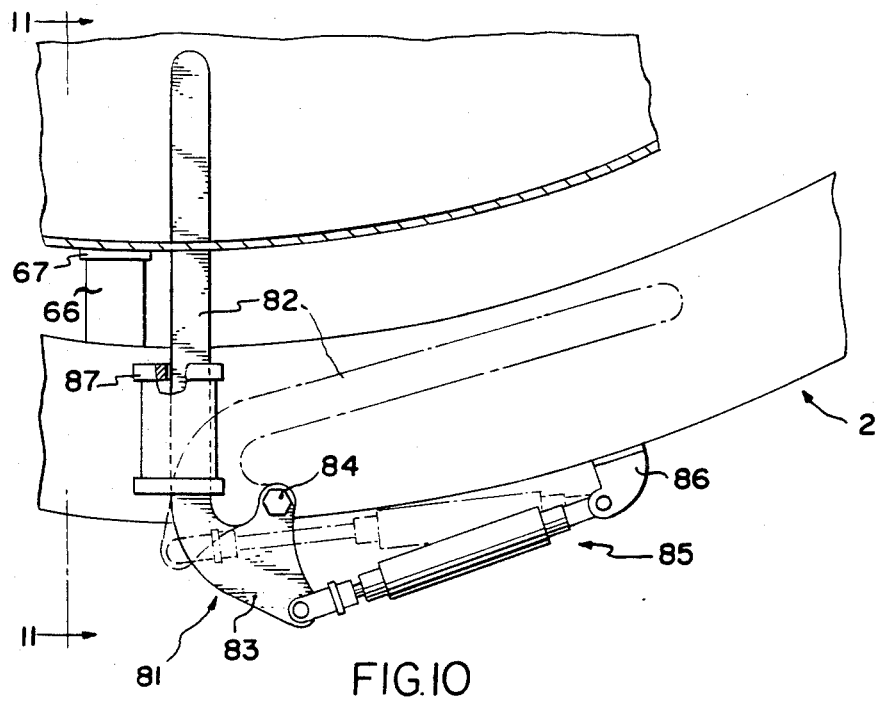
FIG. 10 is a fragmentary, end elevational view of an attachment applicable to the apparatus.
Figure 11:
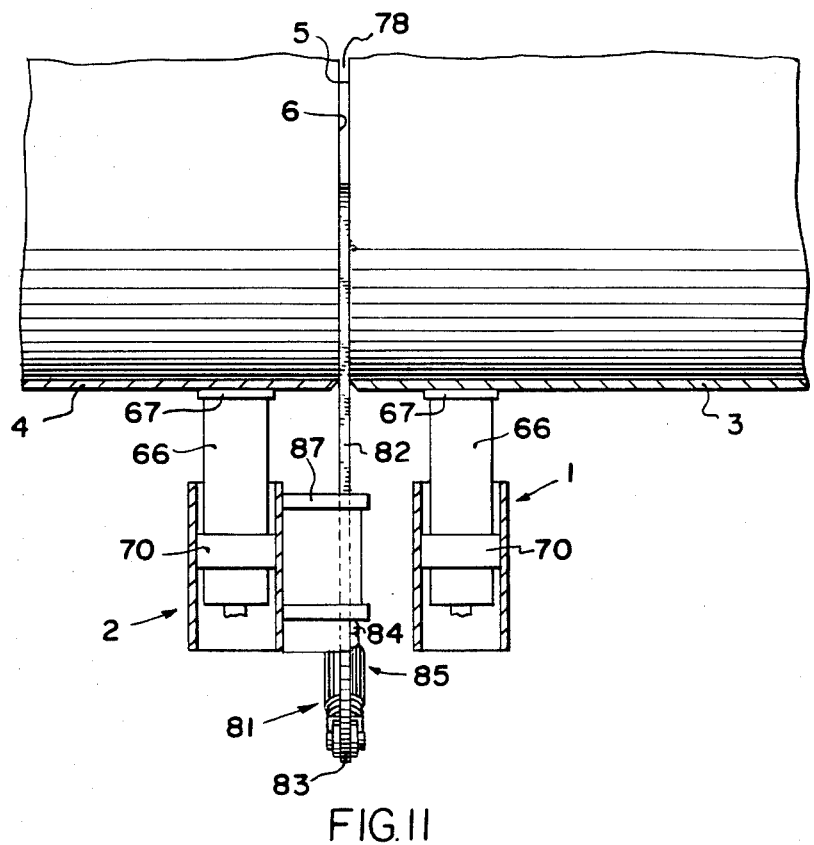
FIG. 11 is a sectional view taken on the line 11—11 of FIG. 10.

If the two pipes 3 and 4 are to be butt welded the confronting ends 5 and 6 normally will be beveled and spaced a short distance apart by a gap 78 (FIG. 9). To facilitate the provision of such gap between the ends of the pipes, the fixed clamp 2 may be provided with a plurality, such as three, of spacing devices 81 (FIGS. 10 and 11), each of which includes an arm 82 extending from one end of a crank 83 pivoted as at 84 to the ring 9 of the clamp 2 and proecting forwardly therefrom toward the clamp 1. The opposite end of the crank 83 is pivoted to one end of an extensible and retractable hydraulic ram 85, the opposite end of which is pivoted to a bracket 86 fixed to the clamp ring 9. Also fixed to the ring 9 is a stop 87 which limits movement in one direction of the arm 82.

In practice, three circumferentially spaced spacers are mounted on the clamp 2 between the latter and the clamp 1. Normally, all of the arms 82 will occupy a retracted or inactive position as is shown in chain lines in FIG. 10. Upon extension of the rams 85, however, the arms 82 will be moved to positions in which they extend radially inwardly, and between the clamps 1 and 2. Movement of the pipes 3 and 4 toward one another will cause their ends to abut the arms 82 to provide the gap 78 therebetween. Once the gap has been provided, the rams 85 may be actuated so as to return the arms 82 to the retracted positions.

Although the apparatus may be used for butt welding pipes to one another, it also may be used to weld such members to one another in telescoping relation. Thus, if the diameters of the two pipes 3 and 4 are such that one may fit snugly into the other, telescoping of the members will require the configuration of one of the pipes to conform closely to that of the other pipe, but to be of sufficiently smaller diameter to be accommodated within the other pipe. This may be accomplished by reforming the ends of the pipes as described earlier, and if the nominal outside diameter of one pipe initially is greater than the nominal inside diameter of the adjacent pipe, the pressure members 61 associated with one of the clamps should be adjusted so that they extend radially inwardly beyond the pressure members associated with the other clamp and by a distance sufficient to contract the diameter of the pipe end that is to be fitted into the other pipe end.

Reforming the configurations of the confronting ends of the respective pipes 3 and 4 usually results in misalignment of the longitudinal axes of such pipes at their confronting ends, thereby necessitating relative adjustment of the pipes transversely of the longitudinal axes. Such transverse adjustment may be effected by extension and contraction of the rams 26 which engage the floating clamp 1 so as to effect bodily movement of the clamp 1 and the pipe 3 transversely of the fixed clamp 2 and the pipe 4. The transverse adjustment of the clamp 1 relative to the clamp 2 is such as to effect alignment of the longitudinal axes of the two pipes. This will compensate for differences in wall thickness between two pipes and, if one pipe is to be telescoped into the other, it will permit this to be done.

If, following reformation of the ends of the pipes and realignment of their longitudinal axes, it should be necessary or desirable to move one pipe to effect relative movement of the pipe ends toward one another, as would be the case if one pipe is to be telescoped into the other, the rams 20 reacting between the shoes 12 and the supports 16 may be operated so as to effect such movement. If the longitudinal axes of the pipes 3 and 4 are not in the desired relationship (coaxial, for example) prior to the pipes' being moved toward one another, such condition may be corrected by individual operation of the rams 20 so as to effect rocking of the clamp 1 relative to the clamp 2 until the desired relationship is established. During such rocking movements the clamp 1 may slide relative to the feet 67 of the pressure members 61.

Once the pipes 3 and 4 have been oriented properly relative to one another, welding operations may be commenced. If it should be desired to rotate the pipes 3 and 4 while maintaining the clamping forces thereon, so as to make it unnecessary for a welder to move around the periphery of the pipes, powered rollers 88 may be projected by rams 89 into engagement with the pipes 3 and 4, and the rollers 76 retracted by contraction of the rams 77. The rollers 88 are journaled for rotation about axes parallel to the longitudinal axes of the pipes 3 and 4, so as to support the pipes for rotation about their own axes. The keepers 36 also should be swung away from the trunnions 32 and the clamp fingers 49 disengaged from the anchor bars 44. Thereafter, the supports 34 may be lowered an amount sufficient to enable the pipes 3 and 4 to be rotated without interference between the supports and any part of the clamp apparatus.

Following completion of the welding operation, the supports 34 may be re-elevated and the anchor bars 44 returned to the sockets 43 so as to restore the parts of the apparatus to the positions illustrated in FIGS. 5 and 6, following which the clamp fingers 49 again may be engaged with the anchor bars 44. Thereafter, the pressure members 61 of the respective clamps 1 and 2 may be extended radially outwardly, or the segments of the clamps separated and expanded, to enable the welded pipes 3 and 4 to be removed from the clamping apparatus.

The disclosed embodiment is representative of a presently preferred form of the invention, but is intended to be illustrative rather than definitive thereof. The invention is defined in the claims.

I claim:

1. Apparatus for use in welding a first annular member having a free end to a second annular, substantially coaxial member having a free end adjacent and confronting the free end of the first member, said apparatus comprising a first annular clamp for applying a clamping force on one of said members adjacent its free end; a second annular clamp substantially coaxial with said first clamp for applying a clamping force on the other of said members adjacent its free end; support means carried by said first clamp and supporting said second clamp in axially spaced, substantially parallel relation relative to said first clamp; a base; and means mounting said first clamp on said base for conjoint swinging movement of said first and second clamps relative to said base.

2. Apparatus according to claim 1 wherein said mounting means mounts said first clamp for said swinging movement about a substantially horizontal axis.

3. Apparatus according to claim 1 including releasable latch means reacting between said base and said mounting means for disabling said swinging movement of said clamps.

4. Apparatus according to claim 3 wherein said latch means comprises a hook movable between engaged and disengaged positions, and means coupled to said hook for moving the latter between said positions.

5. Apparatus according to claim 1 including radially adjustable means carried by each of said clamps and engageable with the associated annular member for reforming its free end.

6. Apparatus according to claim 1 including adjusting means carried by said first clamp and in engagement with said second clamp, said adjusting means being operable to adjust said second clamp substantially universally relative to said first clamp.

7. Apparatus according to claim 6 wherein said adjusting means comprises extensible and retractable ram means.

8. Apparatus according to claim 1 wherein each of said clamps is composed of a plurality of arcuate segments pivoted to one another and together forming an annulus.

9. Apparatus according to claim 1 wherein each of said clamps in an unbroken annulus.

10. Apparatus for use in welding a pair of annular members end-to-end, said apparatus comprising a base; a first annular clamp; a second annular clamp substantially coaxial with said first clamp and axially spaced therefrom whereby one of said clamps may clamp one of said members and the other of said clamps may clamp the other of said members; means mounting said clamps on said base for conjoint swinging movement of said clamps about a common axis relative to said base; and releasable latch means for releasably latching at least one of said clamps in a fixed position relative to said base.

11. Apparatus according to claim 10 wherein said mounting means comprises a pivotal connection between said one of said clamps and said base enabling pivotal movement of said clamps about said common axis.

12. Apparatus according to claim 11 wherein said connecting means comprises a pair of relatively extensible and retractable parts, one of said parts being fixed to said first clamp and the other being connected to said one of said parts and to said second clamp.

13. Apparatus according to claim 12 wherein said other of said parts is slideably connected to said second clamp.

14. Apparatus according to claim 10 wherein said connecting means comprises a plurality of units spaced circumferentially of said clamps, each of said units having a pair of extensible and retractable parts one of which is fixed to said first clamp and the other of which is connected to said one of said parts and to said second clamp.

15. Apparatus according to claim 14 including operating means for extending and retracting the parts of each of said units.

16. Apparatus according to claim 15 wherein the operating means of each unit is operable independently of the operating means of the remaining units.

17. Apparatus according to claim 10 including a plurality of circumferentially spaced pressure devices carried by each of said clamps and extending radially thereof for engagement with the respective ones of said members.

18. Apparatus according to claim 17 including adjusting means for adjusting each of said devices radially of the associated clamps.

19. Apparatus according to claim 10 including means carried by one of said clamps and forming the support for the other of said clamps.

20. Apparatus according to claim 10 including spacer means, and means mounting said spacer means on one of said clamps for movement to a position between said clamps to provide a space between confronting ends of said members.

21. Apparatus for use in welding together a pair of confronting annular members end-to-end, said apparatus comprising a first annular clamp adapted to clamp one of said members adjacent its end; a coaxial second annular clamp supported by said first clamp axially spaced from said first clamp and adapted to clamp that end of the other of said members which confronts said end of said one of said members; a plurality of circumferentially spaced pressure devices carried by each of said clamps for engagement with the associated annular member; adjusting means for adjusting said pressure devices of each of said clamps radially of the associated clamp and independently of the pressure devices of the other of said clamps; and means coupling together a plurality of said pressure devices of each of said clamps for conjoint adjustment thereof.

22. Apparatus according to claim 21 wherein said coupling means includes universal joints.

23. Apparatus according to claim 21 wherein each of said clamps is of such diameter as to encircle its associated annular member externally thereof.

24. Apparatus according to claim 21 including support means carried by said first clamp and providing support for said second clamp.

25. Apparatus according to claim 24 including clamp adjusting means reacting between said support means and said second clamp for effecting relative movements between said first and second clamps.

26. Apparatus according to claim 25 wherein said clamp adjusting means is operable to effect axial movements of said clamps.

27. Apparatus according to claim 25 wherein said clamp adjusting means is operable to effect movements of said clamps transversely of one another.

28. Apparatus according to claim 25 wherein said clamp adjusting means is operable to effect rocking movements of said clamps.

29. Apparatus for use in welding a pair of annular members end-to-end, said apparatus comprising a first annular clamp adapted to encircle and clamp one of said members; a second annular clamp coaxial with and axially spaced from said first clamp and adapted to encircle and clamp the other of said members; a plurality of supports fixed to said first clamp and spaced circumferentially thereof, each of said supports extending axially beyond said first clamp toward and overlying said second clamp to provide support for the latter; axially movable adjusting means carried by said supports and engaging said second clamp for adjusting said second clamp axially of said first clamp; and radially movable adjusting means carried by selected ones of said supports and engaging said second clamp for adjusting the latter transversely of said first clamp.

30. Apparatus according to claim 29 wherein said axially movable adjusting means are operable independently of one another to effect rocking of said second clamp relative to said first clamp.

31. Apparatus according to claim 29 wherein at least two of said supports are provided with said radially movable adjusting means.

32. Apparatus according to claim 29 wherein said radially movable adjusting means are operable independently of one another.

* * * * *